United States Patent
Chappo et al.

(10) Patent No.: US 9,638,810 B2
(45) Date of Patent: May 2, 2017

(54) IMAGING DETECTOR

(71) Applicant: KONINKLIJKE PHILIPS N.V., Eindhoven (NL)

(72) Inventors: Marc Anthony Chappo, Elyria, OH (US); Randall Peter Luhta, Chardon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/422,708

(22) PCT Filed: Nov. 22, 2013

(86) PCT No.: PCT/IB2013/060327
§ 371 (c)(1),
(2) Date: Feb. 20, 2015

(87) PCT Pub. No.: WO2014/087295
PCT Pub. Date: Jun. 12, 2014

(65) Prior Publication Data
US 2015/0276939 A1 Oct. 1, 2015

Related U.S. Application Data

(60) Provisional application No. 61/732,513, filed on Dec. 3, 2012.

(51) Int. Cl.
*G01T 1/208* (2006.01)
*G01T 1/20* (2006.01)
*G01T 1/161* (2006.01)

(52) U.S. Cl.
CPC .............. *G01T 1/208* (2013.01); *G01T 1/161* (2013.01); *G01T 1/2018* (2013.01)

(58) Field of Classification Search
CPC  G01T 1/161; G01T 1/20; G01T 1/208; G01T 1/00; A61B 6/032
See application file for complete search history.

(56) References Cited

U.S. PATENT DOCUMENTS 5,087,819 A   2/1992 Schulz
6,393,092 B1  5/2002 Yoshida
(Continued)

FOREIGN PATENT DOCUMENTS

DE   199012148 U1   2/1991
EP   0416147 A1    3/1991
(Continued)

OTHER PUBLICATIONS

Allier, C. P., et al.; Scintillation light read-out by thin photodiodes in silicon wells; 2000; Nuclear Instruments and Methods in Physics Research Section A: Accelerators, Spectrometers, Detectors and Associated Equipment; 442(1-3) 255-258.

*Primary Examiner* — Marcus Taningco

(57) ABSTRACT

A detector array (112) includes at least one detector pixel (306) with a cavity (400) that defines a three dimensional volume. A surface of the cavity includes at least two photosensitive regions and a non-photosensitive region there between, defining at least two sub-pixels (306i, 3062) which detect light photons traversing within the three dimensional cavity and produce respective signals indicative thereof. The detector array further includes a scintillator (302), including a first sub-portion that is located in the cavity and which emits the light photons in response to absorbing x-ray photons. Light photons emitted by the first sub-portion are detected by both of the at least two sub-pixels

24 Claims, 6 Drawing Sheets

(56) References Cited

U.S. PATENT DOCUMENTS

| | | | |
|---|---|---|---|
| 6,510,195 B1 | 1/2003 | Chappo et al. | |
| 6,593,636 B1 | 7/2003 | Bui | |
| 6,744,052 B1 | 6/2004 | Petersson et al. | |
| 6,933,489 B2 | 8/2005 | Fujii et al. | |
| 7,810,740 B2 | 10/2010 | Shibayama et al. | |
| 7,932,499 B2 | 4/2011 | Furuichi et al. | |
| 7,977,643 B2 | 7/2011 | Weinberg | |
| 8,816,287 B2 | 8/2014 | Weinberg | |
| 9,151,668 B1 | 10/2015 | Nagarkar | |
| 2006/0067472 A1* | 3/2006 | Possin et al. | 378/98.9 |
| 2006/0108533 A1 | 5/2006 | McEvoy et al. | |
| 2009/0121146 A1 | 5/2009 | Luhta et al. | |
| 2012/0187304 A1 | 7/2012 | Ha et al. | |
| 2013/0076910 A1 | 3/2013 | Scott | |
| 2013/0200251 A1 | 8/2013 | Velichko | |
| 2014/0252437 A1 | 9/2014 | Oh et al. | |

FOREIGN PATENT DOCUMENTS

| | | |
|---|---|---|
| EP | 524213 B1 | 9/1994 |
| WO | 9115797 A1 | 10/1991 |

\* cited by examiner

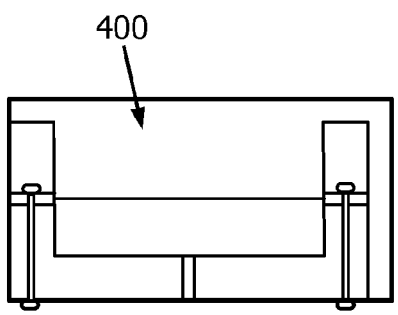

FIG. 12

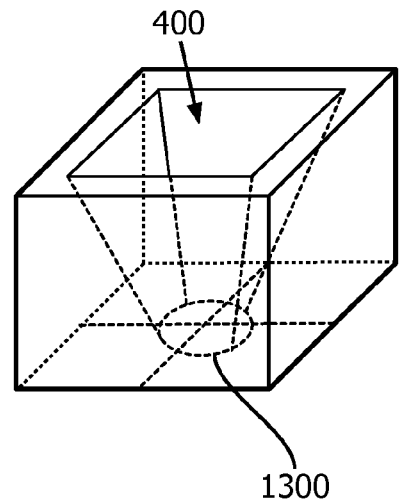

FIG. 13

```
┌─────────────────────────────────────────────┐
│ Obtain radiation sensitive detector array    │
│ having a pixel with a cavity and multiple    │
│ licht detection surfaces                     │
└─────────────────────────────────────────────┘
                      ↓
┌─────────────────────────────────────────────┐
│ Cut scintillator to include a protrusion     │
│ having a geometry of the cavity              │
└─────────────────────────────────────────────┘
                      ↓
┌─────────────────────────────────────────────┐
│ Install cut scintillator on the detector     │
│ tile such that the protrusion is inside the  │
│ cavity                                       │
└─────────────────────────────────────────────┘
                      ↓
┌─────────────────────────────────────────────┐
│ Thin side of scintillator outside of cavity  │
└─────────────────────────────────────────────┘
                      ↓
┌─────────────────────────────────────────────┐
│ Optionally apply reflective                  │
│ coating to the thinned side                  │
└─────────────────────────────────────────────┘
```

IMAGING DETECTOR

CROSS REFERENCE TO RELATED APPLICATIONS

This application is a national filing of PCT application Serial No. PCT/IB2013/060327, filed Nov. 22, 2013, published as WO 2014/087295 A1 on Jun. 12, 2014, which claims the benefit of U.S. provisional application Ser. No. 61/732,513 filed Dec. 3, 2012, which is incorporated herein by reference.

The following generally relates to an imaging detector and more particularly to a high resolution and/or spectral discriminating imaging detector and is described in connection with computed tomography (CT). However, the following is also amenable to other imaging modalities.

A computed tomography (CT) scanner generally includes an x-ray tube mounted on a rotatable gantry that rotates around an examination region about a z-axis. The x-ray tube emits radiation that traverses the examination region and a subject or object positioned therein. A detector array subtends an angular arc opposite the examination region from the x-ray tube, detects radiation that traverses the examination region, and generates a signal indicative thereof. A reconstructor processes the signal and reconstructs volumetric image data indicative thereof the examination region and the portion of the subject or object therein during scanning.

The "real-world" detector implementation issues of high resolution and low dose imaging are contradictory in that detection efficiency is traded off in exchange for higher resolution. By way of example, a detector arrangement has included an array of detector pixels separated by non-active (or non-photosensitive) regions. Each detector pixel includes an active (or photosensitive) region that detects light photons impinging thereon. Geometric efficiency, as a percentage of the area of the detector array, can be defined as the summation of the area of the active regions divided by the area of the detector array, including both the active and the non-active areas.

To increase resolution, given a static detector array size, a width of the active region of each of the detector pixels can be decreased, resulting in smaller and detector pixels for the given static detector array size. However, decreasing the active area of the individual pixels as such increases the area of the non-active regions by percentage, given that there is a minimum fixed separation distance between pixels. This reduction of active area by percentage decreases the geometric efficiency of the detector so there is a tradeoff between resolution and geometric efficiency.

In view of at least the above, there is an unresolved need for other detector configurations which increase resolution with less loss of detector efficiency and, optionally, lower dose.

Aspects described herein address the above-referenced problems and/or others.

In one aspect, a detector array includes at least one detector pixel with a cavity that defines a three dimensional volume. A surface of the cavity includes at least two photosensitive regions and a non-photosensitive region there between, defining at least two sub-pixels which detect light photons traversing within the three dimensional cavity and produce respective signals indicative thereof. The detector array further includes a scintillator, including a first sub-portion that is located in the cavity and which emits the light photons in response to absorbing x-ray photons. Light photons emitted by the first sub-portion are detected by both of the at least two sub-pixels In another aspect, a method includes detecting light photons emitted by a scintillator that is disposed in a three dimensional cavity of a detector pixel, wherein the cavity has a photosensitive surface, and a first sub-portion of the surface corresponds to a first sub-pixel of the detector pixel and a second different sub-portion of the surface corresponds to a second sub-pixel of the detector pixel, and the first and second sub-portions both detect light photons emitted by the scintillator.

In another aspect, a method includes obtaining a detector tile with at least one detector pixel that includes a three dimensional cavity with at least two distinct photosensitive surfaces and installing a scintillator in the cavity.

The invention may take form in various components and arrangements of components, and in various steps and arrangements of steps. The drawings are only for purposes of illustrating the preferred embodiments and are not to be construed as limiting the invention.

FIG. 1 schematically an example imaging system including a detector array with a detector pixel configured for high resolution and/or spectral imaging.

FIG. 2 schematically illustrates a plurality of row of detector tiles of the detector array.

FIG. 3 schematically illustrates an example detector tile of the detector array.

FIG. 4 schematically illustrates a top down view of a high definition detector pixel of the detector array.

FIG. 5 schematically illustrates a cross sectional view, along line A-A of FIG. 4, of the high definition detector pixel of the detector array.

Figure 4:
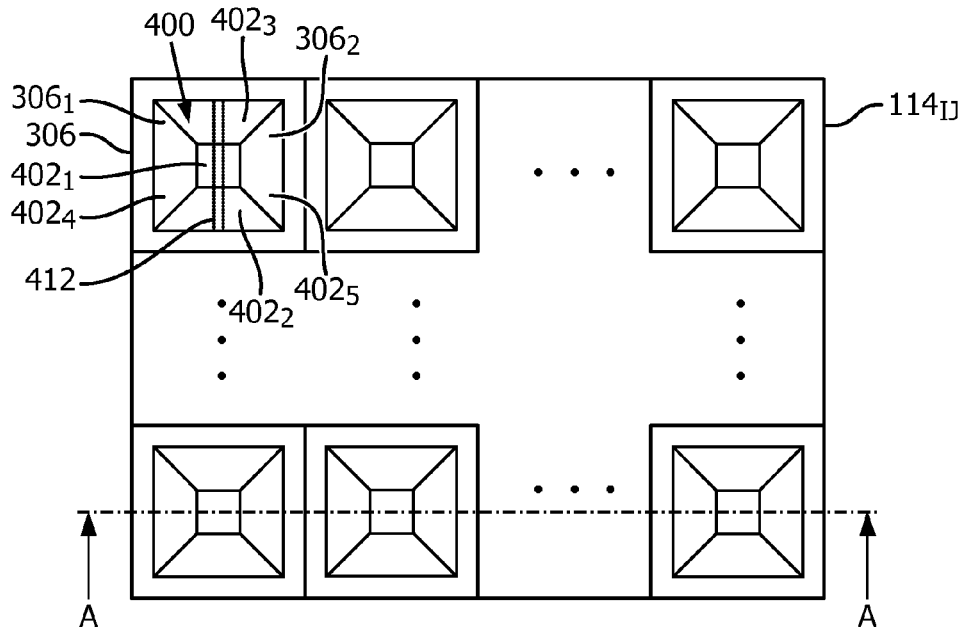
Figure 9:
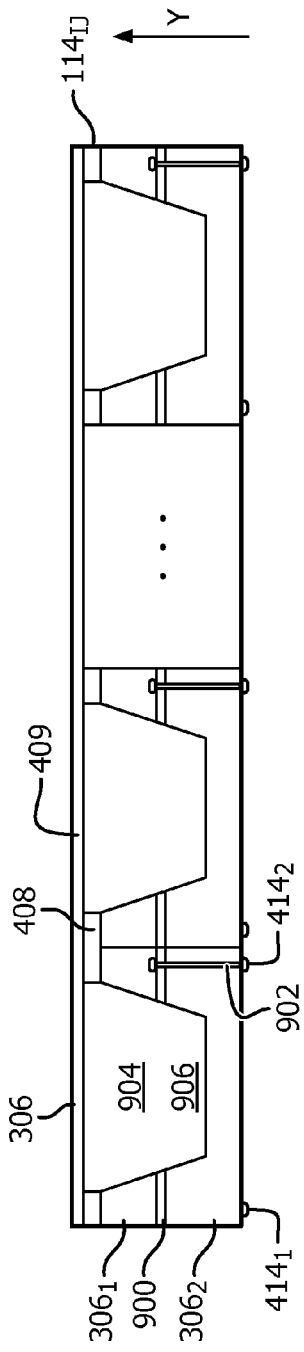

FIG. 9 schematically illustrates a cross sectional view, along line A-A of FIG. 4, of a spectral detector pixel of the detector array having a monolithic scintillator.

Figure 10:
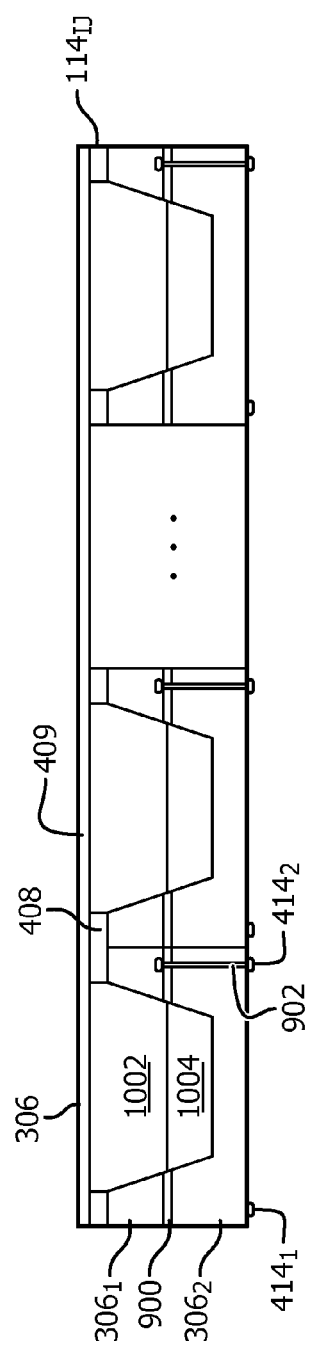

FIG. 10 schematically illustrates a cross sectional view, along line A-A of FIG. 4, of a spectral detector pixel of the detector array having a plurality of spectrally discrete scintillators.

Figure 11:
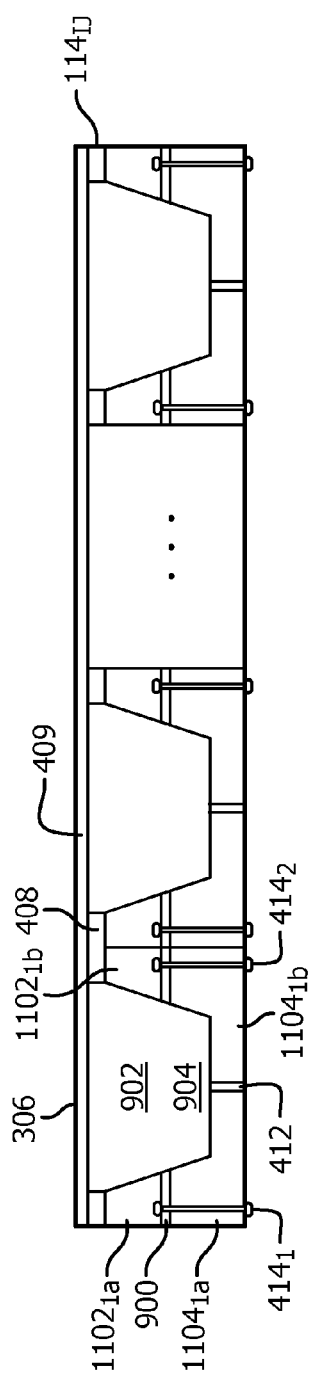

FIG. 11 schematically illustrates a cross sectional view, along line A-A of FIG. 4, of a high definition spectral detector pixel of the detector array.

FIG. 12 schematically illustrates an example detector tile of the detector array that includes a parallelepiped cavity.

FIG. 13 schematically illustrates an example detector tile of the detector array that includes a cavity having a circular bottom.

FIG. 14 illustrates an example method.

Figure 1:
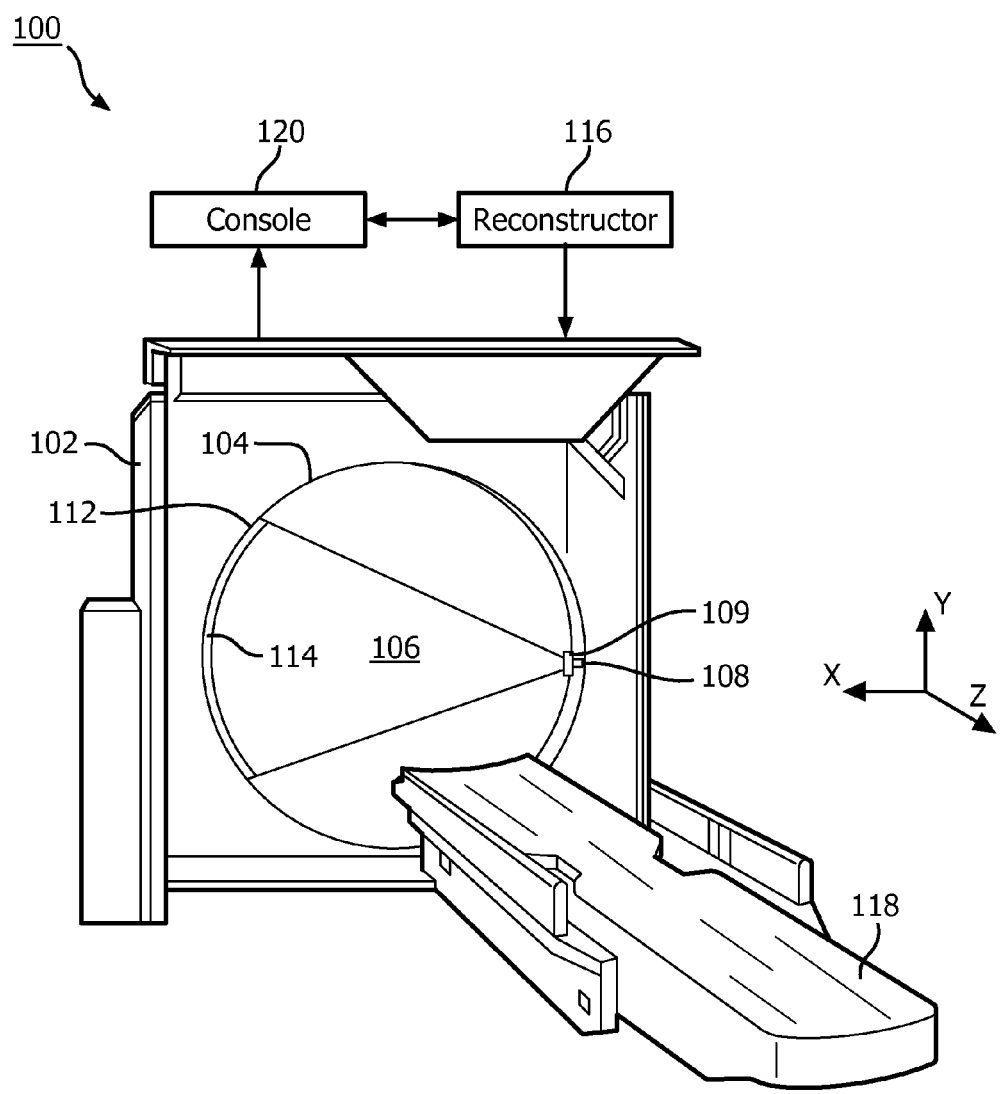

In initially referring to FIG. 1, an imaging system 100, such as a computed tomography (CT) scanner, is illustrated.

The imaging system 100 includes a generally stationary gantry 102 and a rotating gantry 104. The rotating gantry 104 is rotatably supported by the stationary gantry 102 by a bearing (not visible) or the like and rotates around an examination region 106 about a longitudinal or z-axis. A radiation source 108, such as an x-ray tube, is supported by and rotates with the rotating gantry 104, and emits radiation. A collimator 109 collimates the radiation, producing a generally cone, fan, wedge, or otherwise shaped radiation beam that traverses the examination region 106.

A radiation sensitive detector array 112 subtends an angular arc opposite the radiation sources 108 across the examination region 106 and detects radiation traversing the examination region 106 and generates and outputs a signal indicative thereof. The radiation sensitive detector array 112 includes one or more rows of detector tiles 114. U.S. Pat. No. 6,510,195 to Chappo et al., which is incorporated by reference in its entirety herein, describes an example of a suitable detector tile. Optionally, a focused or non-focused anti-scatter grid (ASG) can be employed with the radiation sensitive detector array 112.

Figure 2:
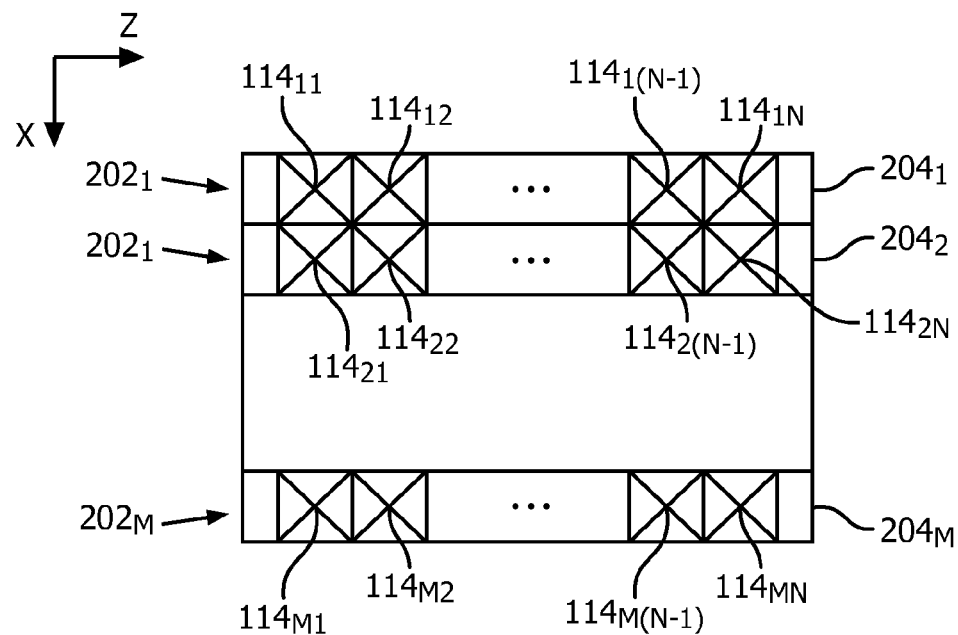

An example of a sub-portion of the detector array 112 is schematically shown in FIG. 2. In this example, M rows (where M is an integer) $202_1, 202_2, \ldots, 202_M$ (collectively referred to as rows 202) include N detector tiles 114 (where N is an integer). The row $202_1$ includes detector tiles $114_{11}, 114_{12}, \ldots, 114_{1(N-1)}, 114_{1N}$. The row $202_2$ includes detector tiles $114_{21}, 114_{22}, \ldots, 114_{2(N-1)}, 114_{2N}$. The row $202_M$ includes detector tiles $114_{M1}, 114_{M2}, \ldots, 114_{M(N-1)}, 114_{MN}$. The N detector tiles 114 are respectively coupled to detector modules $204_1, 204_2, \ldots, 204_M$, which are configured to mount in the system 100, parallel to each other along the z-axis.

Figure 3:
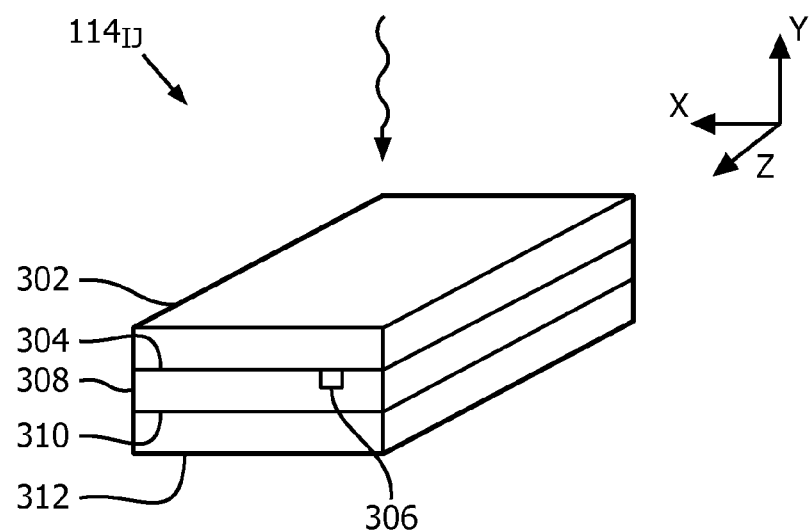

FIG. 3 schematically shows a non-limiting example of a detector tile $114_{IJ}$ (where I and J are integers). Note that the relative geometry (i.e., shape, size, etc.) of the illustrated detector tile $114_{IJ}$ is not limiting. The detector tile $114_{IJ}$ includes a scintillator layer 302 that is optically coupled to a photosensitive side 304 of a photosensitive layer 308. The photosensitive layer 308 has a plurality of active regions or photosensitive pixels 306 (only one shown for sake of clarity) separated by non-active (or non-photosensitive) regions. A non-photosensitive side 310 of the photosensitive layer 308 is electrically coupled to a substrate 312, which includes readout electronics such as an ASIC, and/or other circuitry.

In one instance, the photosensitive layer 308 and the photosensitive pixels 306 are silicon and the photosensitive pixels 306 are part of the photosensitive layer 308. The non-active regions of the photosensitive layer 308 include electrodes that inter-connect each detector pixel to an electrical contact. The substrate 312 can include a silicon ASIC that is directly bonded to the non-photosensitive area of the silicon photosensitive layer 308, in electrical communication with the electrical contacts. A non-limiting example of such a silicon detector is described in U.S. patent application publication 2009/0121146 to Luhta et al., which is incorporated herein by reference in its entirety.

As described in greater detail below, in one instance, a photosensitive pixel 306 includes a recess or cavity that defines a three dimensional (3D) volume and that includes a 3D surface with multiple sub-pixels or active regions separated by non-active regions, wherein a sub-portion of the scintillator is disposed in the cavity and light photons emitted therein are detected in three dimensions by the multiple sub-pixels. Such a configuration allows for increased resolution, relative to a configuration in which the cavity includes only a single pixel. In addition, light collection efficiency is increased, relative to a configuration in which the active region is two dimensional, which allows for reducing dose. Moreover, the multiple sub-pixels allow for spectral imaging.

Returning to FIG. 1, a reconstructor 116 reconstructs the signal output by the detector array 112 and generates volumetric three-dimensional image data. The reconstructor 116 can employ a high resolution, spectral, and/or other reconstruction algorithm to reconstruct the signal. A subject support 118, such as a couch, supports a subject or object in the examination region 106. A general purpose computing system serves as an operator console 120, which includes human readable output devices such as a display and/or printer and input devices such as a keyboard and/or mouse. Software resident on the console 120 allows the operator to control the operation of the imaging system 100, including selection of an imaging protocol and/or reconstruction algorithm such as a higher resolution and/or spectral imaging protocol and/or a reconstruction algorithm.

Figure 5:
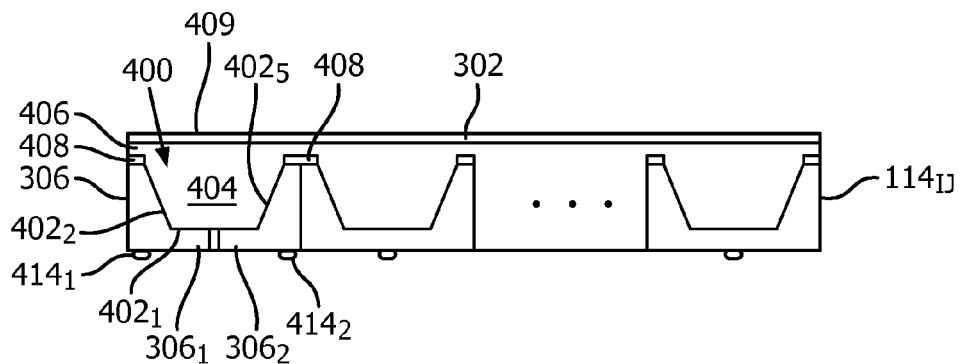

Turning now to FIGS. 4 and 5, an example of the detector tile $114_{IJ}$ is schematically illustrated. FIG. 4 shows a top down view of the detector tile $114_{IJ}$, and FIG. 5 shows a view along line A-A of FIG. 4. In this example, the detector tile $114_{IJ}$ is configured as a high definition tile and/or for high resolution applications.

As shown, a photosensitive pixel 306 includes a three dimensional recess or cavity 400 having multiple photosensitive sides 402. In this configuration, light photons are detected within the three dimensional volume by the multiple photosensitive sides 402. In this non-limiting example, the photosensitive pixel 306 includes five (5) sides 402, a bottom $402_1$, a front $402_2$, a back $402_3$, a left $402_4$ and a right $402_5$ side, with the bottom $402_1$ side generally lying in the x-z plane and the other sides extending therefrom in the y direction.

A first or protruding sub-portion 404 of the scintillator 302 resides in the cavity 400 and a second sub-portion 406 of the scintillator 302 is outside of the cavity 400. The scintillator 302 can include an array of preformed protruding sub-portions 404, each having a geometry corresponding to the geometry of the inside of the cavity 400. Such an array can be installed on the tile 114 via an optical adhesive or the like. In a variation, individual preformed protruding sub-portions 404 can be individually seated in the individual cavities 400. In another variation, the protruding sub-portion 404 can be a powder or slurry deposited into each cavity 400.

An optional radiation shield or blocking material 408 (e.g., tungsten) is located outside of the cavity 400, on a surface of the photosensitive pixel 306 facing the incoming radiation. The material 408, generally, blocks or attenuates radiation impinging at non-active regions. An optional reflective layer 409 is located on a surface 410 of the scintillator 302 facing the incoming radiation. The reflective layer 409 reflects light photons in the cavity 400 back into the cavity 400 and towards the photosensitive regions. The layer 409 can be a coating, a film, or the like. Examples of suitable layers 409 include, but are not limited to, a white paint, a mirror, or the like.

It is to be understood that the cavity 400 can include more or less sides, and that the shape, angle with respect to the bottom side $402_1$, etc. of the sides 402 and/or an orientation of the sides 402 with respect to each other can be different. For example, the bottom side $402_1$ may alternatively be circular, triangular, hexagonal, octagonal, or otherwise shaped bottom, and there may be one, three, six, eight, or other number of sides extending perpendicularly and/or at an angle from the bottom side $402_1$.

In this example, the photosensitive pixel 306 includes two separate active regions or sub-pixels $306_1$ and $306_2$, arranged next to each other along the x-direction, which share the first sub-portion 404 of the scintillator 302 in that they both detect light photons emitted by the first sub-portion 404. A non-photosensitive region 412 resides between the two separate sub-pixels $306_1$ and $306_2$, extending along the z-direction in this example. However, one or more of the non-photosensitive regions 412 could extend along the x-direction or at an angle in the x-z plane.

Electrical contacts $414_1$ and $414_2$ respectively route signals from the two separate sub-pixels $306_1$ and $306_2$ to readout electronics (not shown for sake of clarity).

Figure 6:
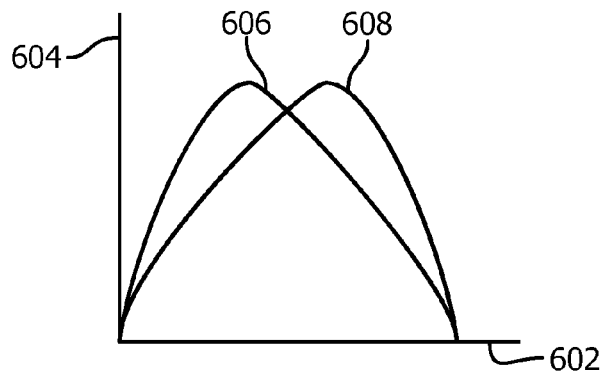
FIG. 6 illustrates the output signal of a pair of sub-pixels of a detector pixel as a function of position along the active region.

Briefly turning to FIG. 6, an output of each of the sub-pixels $306_1$ and $306_2$, moving from left to right in FIG. 5 along the x-direction, is shown. In FIG. 6, an x-axis 602 represent position and a y-axis 604 represents output level. A first curve 606 represents an output of the sub-pixel $306_1$ and a second curve 608 represents an output of the sub-pixel $306_2$. As shown, the two sub-pixels pixels $306_1$ and $306_2$ will produce different output signals, even though they share a common first sub-portion 404 of the scintillator 302. As such, the detector pixel 306 produces higher resolution data relative a configuration in which the non-photosensitive regions 412 is omitted and the pixel 306 produces a single output signal.

Figure 7:
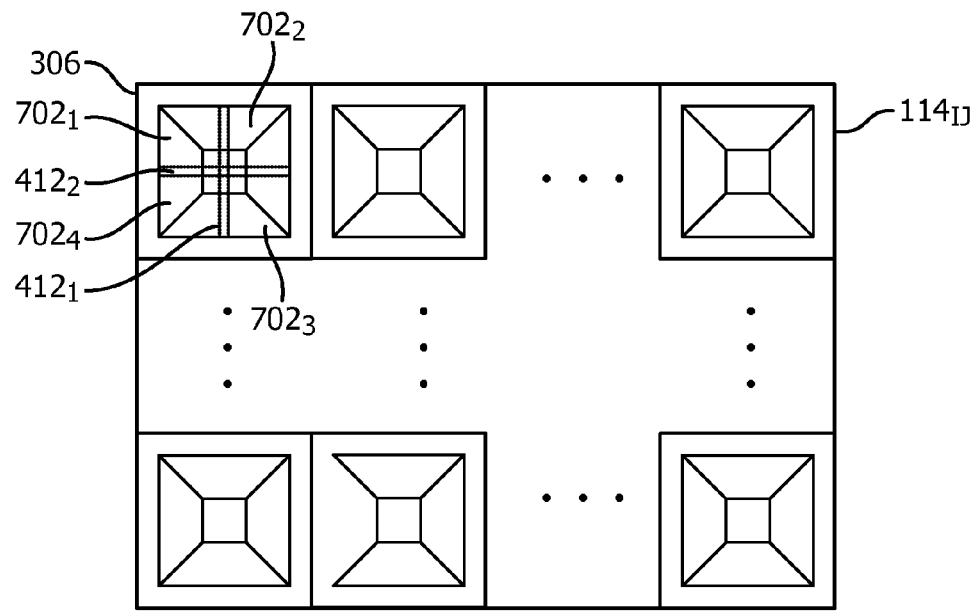
FIG. 7 illustrates an example detector pixel with four active regions.
Figure 8:
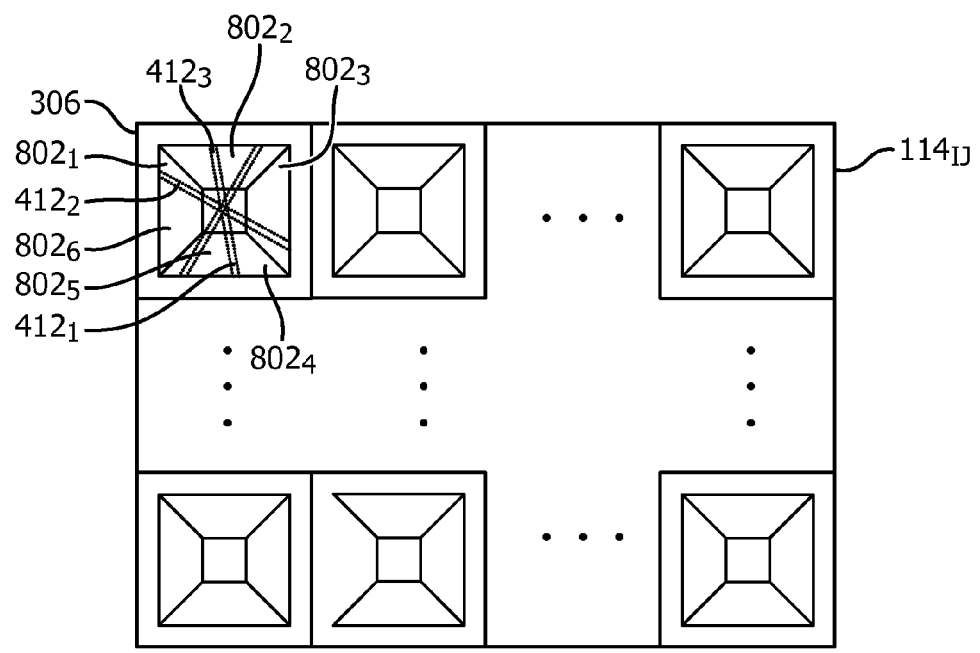
FIG. 8 illustrates an example detector pixel with six active regions.

Next at FIG. 7, an example in which the photosensitive pixel 306 includes four separate sub-pixels $702_1$, $702_2$, $702_3$ and $702_4$, separated by non-photosensitive regions $412_1$ and $412_2$, which share the first sub-portion 404 of the scintillator 302 in the cavity 400 is schematically illustrated. FIG. 8 schematically shows an example in which the photosensitive pixel 306 includes six separate sub-pixels $802_1$, $802_2$, $802_3$, $802_4$, $802_5$ and $802_6$, separated by three non-photosensitive regions $412_1$, $412_2$, and $412_3$, which share the first sub-portion 404 of the scintillator 302 in the cavity 400. Other numbers of sub-pixels and/or arrangements of the by non-photosensitive regions are also contemplated herein.

FIG. 9 schematically shows another example of the detector tile $114_{IJ}$. In this example, the photosensitive pixel 306 similarly includes the two separate sub-pixels $306_1$ and $306_2$; however, the sub-pixels $306_1$ and $306_2$ are layered in the y-direction, with the sub-pixel $306_1$, in this example, being closer to the incoming radiation. A non-photosensitive region 900 likewise resides between the two separate sub-pixels $306_1$ and $306_2$. A via 902 such as a through silicon via (TSV) includes an electrically conductive electrode that routes a signal generated by sub-pixel $306_1$ through the sub-pixel $306_2$ and to the electrical contact $414_2$, which is in electrical communication with the readout electronics.

By having two or more layered sub-pixels of the photosensitive pixel 306 share the first sub-portion 404 of the scintillator 302, the sub-pixel(s) closer to the incoming radiation (sub-pixel $306_1$ in this example) can be used to detect lower energy photons which are absorbed closer to an upper region 904 of the scintillator 302 and the sub-pixel(s) farther from the incoming radiation (sub-pixel $306_2$ in this example) can be used to detect higher energy photons which pass through an upper region 904 of the scintillator 302 and are absorbed closer to a lower region 906 of the scintillator 302.

Such a configuration allows for spectral imaging. By including more layers of sub-pixels with non-photosensitive regions 900 there between, the spectral separation can be increased. Furthermore, the signals from the different layers of sub-pixels can be combined to generate data corresponding to a non-spectral scanner. Note that various components from FIG. 5 are not labeled in FIG. 9 for sake of clarity. Also, the optional shield 408 and the optional reflective layer 409 have been omitted for sake of clarity.

FIG. 10 schematically illustrates another example of the detector tile $114_{IJ}$. This of the detector tile $114_{IJ}$ is substantially similar to that described in connection with FIG. 9 except that discrete scintillators 1002 and 1004 (instead of a monolithic scintillator 302 shown in FIG. 9) including different scintillation material are used for each detected energy level. Although two discrete scintillators 1002 and 1004 are shown in FIG. 10, it is to be understood that the of the detector tile $114_{IJ}$ can include more than two discrete scintillators. Reflective layers (not shown) can be added between the scintillators 1002 and 1004.

FIG. 11 shows another example of the detector tile $114_{IJ}$, which is combination of FIGS. 5 and 9. In this example, the upper layer includes of sub-pixels $1102_{1a}$ and $1102_{1b}$ and the lower layer includes of sub-pixels $1104_{1a}$ and $1100_{2b}$. With this example, both higher resolution and spectral imaging data can be achieved.

FIG. 12 illustrates an embodiment in which the cavity 400 and the scintillator portion 302 therein are rectangular. FIG. 13 illustrates an embodiment in which the cavity 400 includes a circular shaped bottom portion 1300.

FIG. 14 illustrates a method.

It is to be appreciated that the ordering of the acts in the methods described herein is not limiting. As such, other orderings are contemplated herein. In addition, one or more acts may be omitted and/or one or more additional acts may be included.

At 1402, a radiation sensitive detector array including a detector tile with a detector pixel having a cavity with multiple light detection surfaces is obtained.

At 1404, a scintillator is cut to include a protrusion having a geometry corresponding to a geometry of the cavity. The scintillator may be cut via a saw, hot wire, etc. to create the protrusions.

At 1406, the cut scintillator is installed on the detector tile such that the protrusion is inside the cavity. An optical adhesive such as a glue, tape, etc. may be utilized to couple the scintillator and detector pixels.

At 1408, a side of the scintillator opposite of the side installed with the detector tile is thinned. This can be achieved via grinding or otherwise.

At 1410, optionally, a reflective layer can be applied to the thinned side.

As discussed herein, the scintillator can alternatively be applied in the recesses in a powder form or a powder mixed with a binding.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A detector array, comprising:
at least one detector pixel that includes photosensitive regions of a photosensitive layer arranged to define and include a cavity of a three dimensional volume, wherein surfaces of the cavity include at least two photosensitive regions and a non-photosensitive region there between, defining at least two sub-pixels which detect light photons traversing within the three dimensional cavity and produce respective signals indicative thereof, wherein the cavity includes photosensitive surfaces of each of the at least two photosensitive regions that join with an angle of at least one of a group consisting of a perpendicular angle and an oblique angle; and
a scintillator, including a first sub-portion that is located within the cavity and which emits the light photons in response to absorbing x-ray photons, wherein light photons emitted by the first sub-portion are detected by both of the at least two sub-pixels.

2. The detector array of claim 1, wherein the at least two photosensitive regions are arranged with respect to each other along a direction transverse to a direction of incoming radiation, share the first sub-portion of the scintillator, and output different detector signals.

3. The detector array of claim 2, further comprising:
a first electrical contact that routes first electrical signals generated by a first of the at least two photosensitive regions to readout electronics; and
a second different electrical contact that routes second electrical signals generated by a second of the photosensitive regions to the readout electronics.

4. The detector array of claim 3, wherein each of the first and second electrical signals are separately reconstructed.

5. The detector array of claim 1, wherein surfaces of the photosensitive regions that define the cavity include at least two non-parallel surfaces that are photosensitive.

6. The detector array of claim 1, wherein the photosensitive regions are layered in a direction of incoming radiation, and further comprising:
a non-photosensitive material disposed between the at least two sub-pixels, wherein the at least two photosensitive regions share the first sub-portion of the scintillator and output two different detector signals.

7. The detector array of claim 6, wherein the at least two photosensitive regions both detect light photons emitted by the first sub-portion of the scintillator in response to an absorption of x-ray photons by the first sub-portion of the scintillator.

8. The detector array of claim 6, wherein one of the least two photosensitive regions primarily detects first energy photons and another of the at least two photosensitive regions primarily detects second energy photons, where the first and second energies are different energies.

9. The detector array of claim 6, wherein the first sub-portion of the scintillator is monolithic.

10. The detector array of claim 6, wherein the first sub-portion of the scintillator includes layered multiple spectrally discrete sub-scintillators.

11. The detector array of claim 6, further comprising:
an electrode that routes a first electrical signal generated by a photosensitive region located closer to the incoming radiation through a photosensitive region farther from the incoming radiation to a first electrical contact, which routes first electrical signals to readout electronics; and
a second electrical contact that routes a second electrical signal generated by the photosensitive region farther from the incoming radiation to the readout electronics.

12. The detector array of claim 1, wherein the photosensitive regions include at least four photosensitive regions, including a first pair of photosensitive regions arranged along a transverse direction and a second pair of photosensitive regions arranged along the transverse direction, wherein the first and second pairs of photosensitive regions are layered with respect to each other along a direction of incoming radiation; and further comprising:
a first non-photosensitive material disposed between the first pair of photosensitive regions and a second non-photosensitive material disposed between the first and second pairs of photosensitive regions.

13. The detector array of claim 1, wherein the first sub-portion of the scintillator is a preformed sub-portion having a geometry of the cavity, a powder, or a slurry residing in the cavity.

14. A method, comprising:
detecting light photons emitted by a scintillator that is disposed in a three dimensional cavity with photosensitive surfaces that defines a detector pixel, wherein the cavity has a first sub-portion of the surfaces corresponds to a first sub-pixel of the detector pixel and a second different sub-portion of the surfaces corresponds to a second sub-pixel of the detector pixel, and the first and second sub-portions both detect light photons emitted by the scintillator, wherein the photosensitive surfaces of the cavity include at least two opposing surfaces which are non-parallel surfaces.

15. The method of claim 14, wherein one of the first or second sub-portions primarily detects photons having first energy and the other of the first or second sub-portions primarily detects photons having second energy, wherein the first and second energy are different energies.

16. The method of claim 15, wherein the first and second sub-portions are layered in a direction of incoming radiation.

17. The method of claim 15, further comprising:
reconstructing data corresponding to the photons having first energy and generating a first spectral image; and
reconstructing data corresponding to the photons having second energy and generating a second spectral image.

18. The method of claim 15, wherein the first and second sub-portions are arranged next to each other along a direction transverse to a direction of incoming radiation.

19. The method of claim 14, further comprising:
reconstructing data corresponding to the photons detected by the first sub-portion and the photons detected by the second sub-portion separately, thereby generating higher resolution data.

20. A method, comprising:
obtaining a detector tile with at least one detector pixel that includes a three dimensional cavity with a surface of at least two distinct photosensitive surfaces, wherein the at least two distinct photosensitive surfaces of the three dimensional cavity face each other and include surfaces that are non-parallel; and
installing a scintillator in the cavity.

21. The method of claim 20, wherein the scintillator includes a preformed protrusion having a shape corresponding to a geometry of the cavity; and
installing the protrusion in the cavity.

22. The method of claim 21, further comprising:
thinning a side of the scintillator opposite the protrusion; and
applying a reflective layer over the thinned side.

23. The method of claim 20, further comprising:
installing the scintillator by filling the cavity with a powder scintillator material.

24. The method of claim 20, further comprising:
installing the scintillator by filling the cavity with a scintillator slurry.

* * * * *